United States Patent [19]

Moyer

[11] 4,192,225

[45] Mar. 11, 1980

[54] CYLINDER LOCKING RING

[75] Inventor: Laurence Moyer, Partridge, Kans.

[73] Assignee: The Cessna Aircraft Company, Wichita, Kans.

[21] Appl. No.: 876,777

[22] Filed: Feb. 10, 1978

[51] Int. Cl.² .............................................. F16J 11/02
[52] U.S. Cl. ...................................... 92/169; 285/321; 92/165 R
[58] Field of Search ........... 92/171, 169, 170, 165 PR, 92/165 R; 285/321, 305

[56] References Cited

U.S. PATENT DOCUMENTS

| 2,038,869 | 4/1936 | Rader | 285/321 X |
| 2,890,073 | 6/1959 | Thomas | 285/305 UX |
| 3,391,954 | 7/1968 | Callahan | 285/321 X |
| 3,560,026 | 2/1971 | Roe | 285/321 X |
| 3,650,182 | 3/1972 | Phillips | 285/321 X |

Primary Examiner—Wayne L. Shedd

[57] ABSTRACT

A locking wire joint in a hydraulic cylinder between the barrel and bearing which also prevents rotational movement therebetween; including a locking wire having a U-shaped end, the wire being insertable through a slot in the cylinder barrel into a pair of mating annular grooves; with the u-shaped end engageable with the slot to lock the connected cylinder parts against rotation.

10 Claims, 6 Drawing Figures

CYLINDER LOCKING RING

BACKGROUND OF THE INVENTION

The invention relates to high pressure hydraulic cylinders with an improved mechanical joint for joining the barrel of the cylinder to the bearing or head end. More particularly, the invention relates to a locking wire type joint which prevents relative rotational movement between the cylinder barrel and mating end member.

In the hydraulic cylinder industry it has been a well-known concept to use a removable locking wire between matching grooves in the cylinder barrel and bearing to hold the bearing in place, such as the joints shown in the patents to Ingram U.S. Pat. No. 1,464,386, and Thomas, U.S. Pat. No. 2,890,073. The locking wires used in hydraulic cylinders are basically the same as taught in the above mentioned Ingram patent. One of the problems with this type of joint is that there was no means to prevent rotational movement between the barrel and the bearing end, and therefore in situations where an application required a positive positioning between the cylinder barrel and its mating part, this design could not be used. In the Thomas patent in FIG. 8, in species is shown with an offset bend in the end of the wire. However, the bearing is prevented from rotation in only one direction since the shoulder 60 will not provide a positive lock. Another disadvantage of these prior art wire joints was the difficulty required in disassembling the cylinder due to the difficulty in removing or prying out the wire end during disassembly.

SUMMARY OF THE INVENTION

The present invention not only provides an easily removable wire ring locking joint, but also locks the bearing or head end against rotation with respect to the cylinder barrel due to the snap fit of the u-shaped end of the wire in the radially extending slot. The slot extends generally radially in depth, circumferentially in length, and parallel to the cylinder axis in width. While the slot extends generally radially, its end walls are substantially parallel to each other. The slot has sufficient width, even with the u-shaped end flush with the circumference of the cylinder barrel, so that a screw driver or similar tool can be inserted under the wire so it can be easily pried out of the slot for removal and disassembly of the cylinder.

The principal object of the present invention is to provide a locking wire joint between the cylinder barrel and bearing end which also prevents relative rotational movement between the two mating parts.

Another object of the present invention is to provide a locking joint between a cylinder barrel and bearing end which is easily assembled or disassembled.

Another object of the present invention is to provide a very simplified and inexpensive removable locking joint between a cylinder barrel and its bearing or head end.

Another object of the invention is to provide a locking wire which provides a positive angular position of a fluid port in the bearing relative to a fluid entry port in the cylinder barrel regardless in which direction the wire is inserted.

Further objects and advantages of the present invention are set forth in the following detailed description and accompanying drawings of the preferred embodiments.

DETAILED DESCRIPTION OF THE PREFERRED EMBODIMENTS

Figure 1:
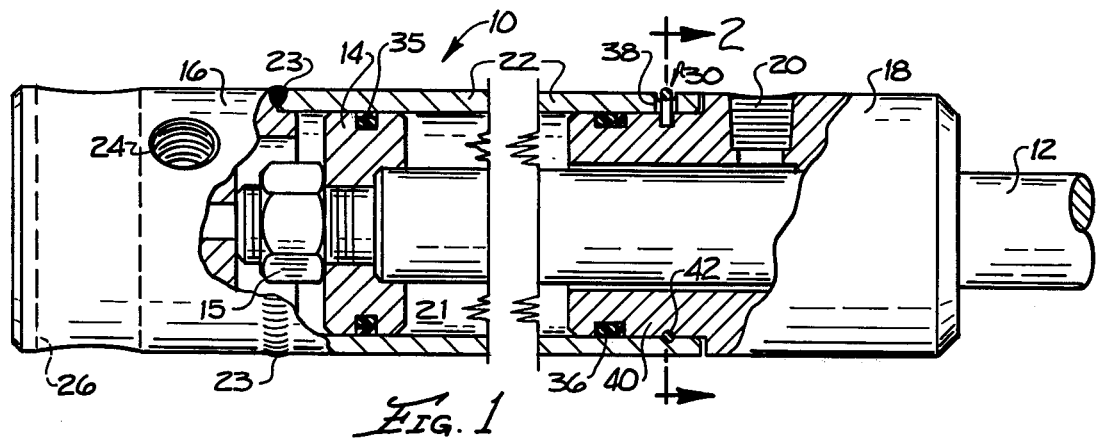
FIG. 1 is a view of a hydraulic cylinder with portions of the cylinder broken away and portions shown in longitudinal section.

More particularly, FIG. 1 illustrates a double-acting linear hydraulic cylinder 10 having a barrel 22 closed at one end by head 16 and the other end by bearing 18. Longitudinally reciprocating within cylinder 10 is piston 14 attached to piston rod 12 by nut 15. Head 16 of the cylinder is welded to the barrel 22 by a circumferential weld 23. Head 16 could also be attached to the barrel 22 by a similar locking wire 30 described hereinafter. Located in head 16 is a fluid entry port 24 and a mounting bearing hole 26, shown in dotted line. Located in bearing 18 is a similar fluid port 20 which supplies the right end chamber 21 of the hydraulic cylinder 10. The seal 35 in piston 14 is a conventional o-ring and packing ring. A similar seal 36 is shown between bearing 18 and barrel 22.

Bearing 18 is held in place by removable locking wire 30 which is inserted and removed through slot 38 in the cylinder barrel 22. The inner end of bearing 18 has a reduced diameter portion 40 which slides into the open end of cylinder barrel 22. Located in the reduced diameter portion 40 is an annular semi-circular groove 42 which concentrically matches with a similar annular groove 44 in the inner surface of cylinder barrel 22. When bearing 18 is properly positioned in cylinder barrel 22, the annular grooves 42 and 44 are longitudinally aligned to provide a complete circular groove for receipt of wire ring 30.

Figures 2, 5, 6:
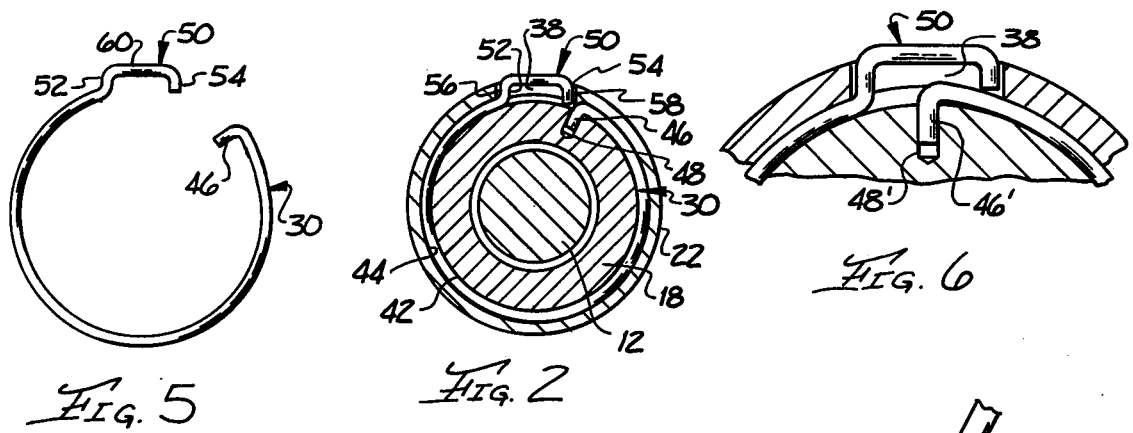
FIG. 2 is a lateral sectional view taken along lines 2—2 of FIG. 1.
FIG. 5 is a plan view of the locking wire.
FIG. 6 is a fragmentary view of a modified form of locking wire.
Figure 3:
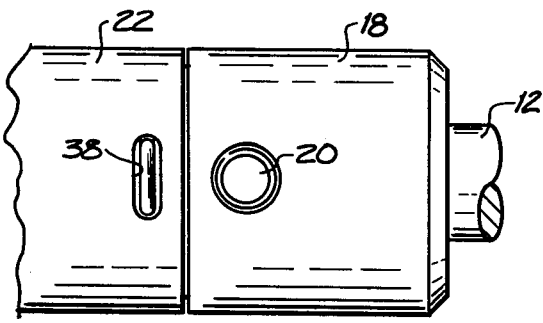
FIG. 3 is a top view of the bearing end of a cylinder.
Figure 4:
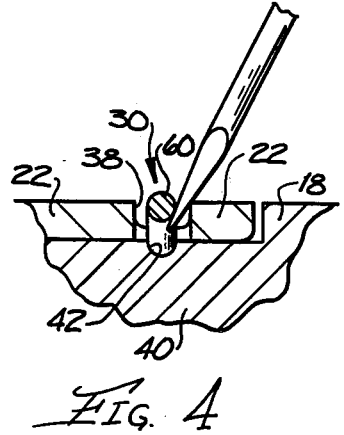
FIG. 4 is an enlarged fragmentary sectional view of the locking wire being removed from the cylinder.

Referring specifically to FIG. 2, the inner end of wire locking ring 30 has a hook portion 46 which is engaged in an anchor hole 48 in the reduced diameter portion 40 of the bearing 18. The outer end 50 of locking wire 30 is u-shaped with sides of the "U" 52 and 54 being positioned essentially normal to the circumference of the wire ring 30, while the web portion 60 of the u-shaped end is essentially tangent to the circumference of ring 30. When the wire ring 30 is in its locking position, the sides 52 and 54 of the outer end are in snug contacting relation with the end walls 56 and 58 of the slot 38 in the barrel. Once in this locked position, bearing 18 is locked against any rotational movement relative to barrel 22. The radially extending slot 38, as can be seen in FIGS. 3 and 4, has a width greater than the diameter of locking wire 30 so that a screw driver can be easily inserted under the wire for disassembly of the cylinder, as seen in FIG. 4.

FIG. 6 illustrates a modified form of locking wire 30', wherein the inner end of the wire 46' is positioned in the center of the u-shaped end 50 instead of off to the side as in FIG. 2. With an anchor hole 48' in the center of slot 38, the locking wire 30' can be pulled in from either direction and there will always be proper alignment between the barrel 22 and bearing 18. This simplifies the assembly procedure, since the cylinder cannot be improperly assembled the fluid port 20 being out of angular position relative to the fluid entry port 24. The minimum width of the slot to permit easy removal of the u-shaped end of the locking wire ring with an ordinary screwdriver is greater than one and one-quarter times the diameter or width of the locking wire.

OPERATION

To assemble the cylinder, the reduced diameter portion of the bearing 18 is inserted within the barrel 22 until the respective grooves 42 and 44 are in alignment. The turned-in inner end 46 of locking wire 30 is then inserted through slot 38 in the cylinder barrel into engagement with anchor hole 48. Bearing 18 is then rotated in a counterclockwise direction, as seen in FIG. 2, drawing the locking wire into grooves 42 and 44. In the FIG. 6, it can also be pulled in from a clockwise direction. As the u-shaped end 50 of the locking wire is drawing into slot 38, the sides of the wire 52 and 54 will come into abutting relation with the respective end walls 56 and 58 of the slot preventing any further relative rotation in either direction. Since the abutting surfaces between the end walls of the slot 54 and 56, and the sides of the locking wire 52 and 54 are essentially normally positioned with respect to rotation between the cylinder barrel 22 and bearing 18, there is no tendency for the locking wire 30 to deflect out of slot 38 and permit the relative parts to rotate.

When it is desired to disassemble the cylinder to replace the seals or inspect the interior parts, it is merely necessary to pry the outer end 50 of the locking wire up with a screw driver, as seen in FIG. 4, until the side 54 clears the barrel 22 and then the bearing 18 is rotated clockwise with respect to cylinder barrel 22, as seen in FIG. 2, until the wire 30 is completed removed.

The pair of matching annular grooves 42 and 44 are preferably cold rolled into each particular part by a forming tool. Radial slot 38 is then punched in the cylinder barrel 22 from the inside out and the width of the slot is always greater than the locking wire thickness so as to facilitate easy removal. The size of the wire used depends upon the design requirements of the cylinder, with a larger diameter wire being utilized for heavier loads. The web portion 60 of the locking wire 30 is located essentially flush with the outer diameter of cylinder barrel 22 in its locked position, as can be seen in FIG. 4, so as not to permit the wire to be accidentally snagged or cause an obstruction during use.

While the joint is shown with the bearing extending inside the cylinder barrel, it could also be designed with the bearing extending over the outside of barrel 22 with the slot 38 in the bearing rather than the barrel.

It can therefore be seen that the present invention provides a simple and novel mechanical joint for removably fastening the bearing or head closure member to the cylinder barrel without permitting relative rotation therebetween.

Having fully described my invention with sufficient clarity to enable those skilled in the art to construct and use it, I claim:

1. A mechanical closure for the end of a linear hydraulic cylinder including a cylinder barrel having an open end with:
    a closure member closing the open end of the cylinder barrel and defining a fluid tight chamber;
    a pair of matching annular grooves concentrically spaced and longitudinally aligned with each other, one groove located in the cylinder barrel and the other in the closure member;
    a radially extending slot extending from the exterior into the outer annular groove; and
    a locking wire ring which is removably inserted in said pair of annular grooves through the slot, locking the closure member to the cylinder barrel; and
    locking means in the cylinder for holding the inner end of the wire ring to the closure member;
in which the improvement comprises:
    a pair of substantially prallel end walls on the radially extending slot; and
    a u-shaped outer end on the locking wire ring, having sides parallel to each other and substantially normally spaced with respect to the circumference of the ring in side-by-side contact with the end walls of the slot so as to lock the closure member to the barrel against rotational movement.

2. A mechanical closure as set forth in claim 1, wherein the wire ring is round in cross section and the radially extending slot has a width greater than one and one-quarter time the cross sectional diameter of the ring.

3. A mechanical closure as set forth in claim 1, wherein the radially extending slot has a width greater than one and one-quarter time the cross sectional diameter of the ring.

4. A mechanical closure as set forth in claim 1, wherein the u-shaped outer end has a connecting web portion, which when assembled is substantially flush with the cylinder barrel and the radially extending slot has a greater width than one and one-quarter time the cross sectional diameter of the ring.

5. A mechanical closure for the end of a linear hydraulic cylinder including a cylinder barrel having an open end with a bearing end removably inserted in the open end, having
    a first annular groove inside the cylinder barrel adjacent the open end;
    a second annular groove on the bearing end concentrically spaced and longitudinally alinged with the first annular groove;
    a radially extending slot in the cylinder barrel having parallel end walls and extending into the first annular groove;
    a locking wire ring which is removably inserted in said pair of annular grooves locking the bearing to the cylinder barrel; and
    means for locking the inner end of the ring to the bearing end;
in which the improvement comprises:
    a u-shaped outer end of the ring with the sides of the "U" being substantially normal to the circumference of the ring and spaced apart a distance for receipt in said radial slot with the sides of the "U" in contact with the end walls of the slot.

6. A mechanical closure as set forth in claim 5, wherein the wire ring is round in cross section and the radially extending slot has a width greater than one and one-quarter times the cross sectional diameter of the ring.

7. A mechanical closure as set forth in claim 5, wherein the radially extending slot has a width substantially twice the cross sectional diameter of the ring.

8. A mechanical closure as set forth in claim 5, wherein the u-shaped outer end has a connecting web portion which when assembled is substantially flush with the cylinder barrel and the radially extending slot has a greater width then one and one-quarter times the cross sectional diameter of the ring.

9. A mechanical closure as set forth in claim 5, wherein the radially extending slot extends through a length of at least a 20° arc and has a width substantially twice the cross sectional diameter of the wire ring.

10. A mechanical closure as set forth in claim 5, wherein the locking means comprises a turned-in end, insertable in an anchor hole in the bearing, the turned-in end being radially positioned in the center of the u-shaped outer end.

* * * * *